(12) United States Patent
Dai et al.

(10) Patent No.: US 11,600,060 B2
(45) Date of Patent: Mar. 7, 2023

(54) NONLINEAR ALL-OPTICAL DEEP-LEARNING SYSTEM AND METHOD WITH MULTISTAGE SPACE-FREQUENCY DOMAIN MODULATION

(71) Applicant: Tsinghua University, Beijing (CN)

(72) Inventors: Qionghai Dai, Beijing (CN); Tao Yan, Beijing (CN); Jiamin Wu, Beijing (CN); Xing Lin, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 425 days.

(21) Appl. No.: 16/893,071

(22) Filed: Jun. 4, 2020

(65) Prior Publication Data
US 2020/0387780 A1 Dec. 10, 2020

(30) Foreign Application Priority Data

Jun. 5, 2019 (CN) .......................... 201910487242.0

(51) Int. Cl.
| | | |
|---|---|---|
| *G06V 10/82* | (2022.01) | |
| *G06N 3/04* | (2023.01) | |
| *G06N 3/067* | (2006.01) | |
| *G06N 3/08* | (2023.01) | |
| *G06T 3/40* | (2006.01) | |

(52) U.S. Cl.
CPC .............. *G06V 10/82* (2022.01); *G06N 3/04* (2013.01); *G06N 3/0675* (2013.01); *G06N 3/08* (2013.01); *G06T 3/4046* (2013.01)

(58) Field of Classification Search
CPC .......... G06N 3/04; G06N 3/08; G06N 3/0675; G06V 10/82; G06T 3/4046
See application file for complete search history.

(56) References Cited

FOREIGN PATENT DOCUMENTS

| | | |
|---|---|---|
| CN | 101150402 A | 3/2008 |
| CN | 105116488 A | 12/2015 |
| CN | 105700320 A | 6/2016 |
| CN | 106100752 A | 11/2016 |
| CN | 107958475 A | 4/2018 |

(Continued)

OTHER PUBLICATIONS

English translation of the Office Action dated Jan. 18, 2021 from the Chinese State Intellectual Property Office, for corresponding Chinese Application No. 201910487242.0.

(Continued)

*Primary Examiner* — Daniel G Mariam
(74) *Attorney, Agent, or Firm* — David D. Brush; Westman, Champlin & Koehler, P.A.

(57) ABSTRACT

The present disclosure discloses a nonlinear all-optical deep-learning system and method with multistage space-frequency domain modulation. The system includes an optical input module, configured to convert input information to optical information, a multistage space-frequency domain modulation module, configured to perform multistage space-frequency domain modulation on the optical information generated by the optical input module so as to generate modulated optical information, and an information acquisition module, configured to transform the modulated optical information onto a Fourier plane or an image plane, and to acquire the transformed optical information so as to generate processed optical information.

17 Claims, 8 Drawing Sheets

(56) References Cited

FOREIGN PATENT DOCUMENTS

CN 108805278 A 11/2018

OTHER PUBLICATIONS

Lin X. et al., "All-optical machine learning using diffractive deep neural networks", Optical Computing, vol. 361, No. 6406, pp. 1004-1008, dated Sep. 7, 2018.

Cheng Wanqi, "Research on optical implementation of image encryption". Information Technology Series, Master's Thesis, dated Jun. 15, 2018.

Chang J. et al., "Hybrid optical-electronic convolutional neural networks with optimized diffractive optics for image classification", Scientific Reports, pp. 1-10, DOI: 10.1038/s41598-018-30619-y, dated Aug. 17, 2018.

Waller L. et al., "Phase-space measurement and coherence synthesis of optical beams", Nature Photonics, vol. 6, pp. 474-479, DOI: 10.1038/NPHOTON.2012.144, dated Jul. 31, 2012.

(a) Classification Standards  (b) Handwritten Digit Image  (c) Classification Result

NONLINEAR ALL-OPTICAL DEEP-LEARNING SYSTEM AND METHOD WITH MULTISTAGE SPACE-FREQUENCY DOMAIN MODULATION

CROSS REFERENCE TO RELATED APPLICATION

This application claims priority under 35 U.S.C. § 119(a) on Chinese Patent Application No. 201910487242.0, filed with the State Intellectual Property Office of P. R. China on Jun. 5, 2019, the entire contents of which are incorporated herein by reference.

TECHNICAL FIELD

The present disclosure relates to a field of photoelectric calculation and machine learning technologies, and more particularly, to a nonlinear all-optical deep-learning system and method with multistage space-frequency domain modulation.

BACKGROUND

Deep learning is one of the machine learning methods developed most quickly. The method uses a multi-layer artificial neural network implemented in a computer to learn information in data in a digital manner, and is capable of performing advanced tasks with performance comparable to or even better than human beings. Recently, deep learning makes significant progress in the field of machine learning, such as medical image analysis, speech recognition, image classification, and the like.

Currently, an all-optical diffraction-depth neural network is proposed, which implements an all-optical machine learning by using passive optical elements. Such a scheme may be used for designing a lamination of diffraction optical elements similar to the artificial neural network through deep learning, for patterning and manufacturing through a 3D printing, or for implementing functions such handwritten digit image classification of fashion products and the like. The scheme may execute some functions based on the neural network at a speed of light, and create an effective and quick mode to implement machine learning tasks.

It is promising to implement machine learning tasks in the all-optical artificial neural network, since it has obvious advantages in parallel computation capability, power consumption, and efficiency. The all-optical diffraction-depth neural network provides an effective and unique all-optical machine-learning model for implementing a diffraction operation at the speed of light by using passive elements. One important advantage of the model is that it may be easily extended by using various optical elements and detection systems with high-throughput and large area and based on 3D manufacturing methods and a wide field, and thus may implement hundreds of millions of neurons and billions of connections economically and efficiently in an extensible manner with low power-consumption, thereby having a potential to implement various complex applications. However, the above all-optical diffraction depth neural network only performs special function by performing modulation in spatial domain with the lamination of diffraction layers, with limitations in complexity of tasks as well as performance Particularly, it is limited in those tasks with higher requirements for nonlinearity.

SUMMARY

Embodiments of the present disclosure aim to solve at least one of the technical problems in the related art to at least some extent.

To this end, one objective of the present disclosure is to propose a nonlinear all-optical deep-learning system with multistage space-frequency domain modulation, capable of improving performance of all-optical deep learning, enabling an all-optical deep-learning model to complete more complex machine learning tasks better, and to complete complex nonlinear computation tasks.

Another objective of the present disclosure is to propose a nonlinear all-optical deep-learning method with multistage space-frequency domain modulation.

In order to achieve the above objectives, embodiments of an aspect of the present disclosure provide a nonlinear all-optical deep-learning system with multistage space-frequency domain modulation, including: an optical input module, configured to convert input information to optical information; a multistage space-frequency domain modulation module, configured to perform multistage space-frequency domain modulation on the optical information generated by the optical input module so as to generate modulated optical information; and an information acquisition module, configured to transform the modulated optical information onto a Fourier plane or an image plane, and to acquire the transformed optical information so as to generate processed optical information.

In order to achieve the above objectives, embodiments of another aspect of the present disclosure provide a nonlinear all-optical deep-learning method with multistage space-frequency domain modulation, including: establishing a numerical simulation model of an optical system with multistage space-frequency domain modulation, the system comprising an optical input module configured to convert input information to optical information, a multistage space-frequency domain modulation module configured to perform multistage space-frequency domain modulation on the optical information generated by the optical input module so as to generate modulated optical information, and an information acquisition module configured to transform the modulated optical information onto a Fourier plane or an image plane and to acquire the transformed optical information so as to generate processed optical information; obtaining an optimized simulation model by optimizing structure and parameters of the optical system with a deep-learning algorithm; and manufacturing a physical model of the optical system in which a hardware system is installed to implement a target function.

With the nonlinear all-optical deep-learning system and method with multistage space-frequency domain modulation according to the embodiments of the present disclosure, some functions based on the neural network may be executed by using the optical elements at a speed of light, thereby creating an effective and quick mode to implement machine learning tasks. Additionally, the system may be easily extended by using various optical elements and detection systems with high-throughput and large area and based on 3D manufacturing methods and a wide field, and thus may implement a large-scale neural network economically and efficiently in an extensible manner with low power-consumption, thereby having a potential to implement various complex applications.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference digits throughout the descriptions. Embodiments described herein with reference to drawings are explanatory, serve to explain the present disclosure, and are not construed to limit embodiments of the present disclosure.

In order to eliminate or moderate drawbacks and limitation in a conventional all-optical artificial neural network for completing machine learning tasks, the nonlinear all-optical deep-learning system and method with multistage space-frequency domain modulation perform modulation on optical information alternately in frequency domain and in spatial domain by utilizing the characteristics of lens in Fourier transformation, and introduce a nonlinear modulation layer by utilizing nonlinear optical devices such as photorefractive crystal is utilized, thereby improving performance of all-optical deep learning, enabling an all-optical deep-learning model to complete more complex machine learning tasks better, and particularly to complete complex nonlinear computation tasks. Further, since most of the computations are executed in Fourier spact, the model of the nonlinear all-optical deep-learning system with multistage space-frequency domain modulation according to the present disclosure is more simplified.

Next, the nonlinear all-optical deep-learning system and method with multistage space-frequency domain modulation according to embodiments of the present disclosure will be described below with reference to the accompanying drawings.

Firstly, the multistage space-frequency domain modulation nonlinear all-optical deep-learning system according to an embodiment of the present disclosure will be described with reference to the accompanying drawings.

Figure 1:
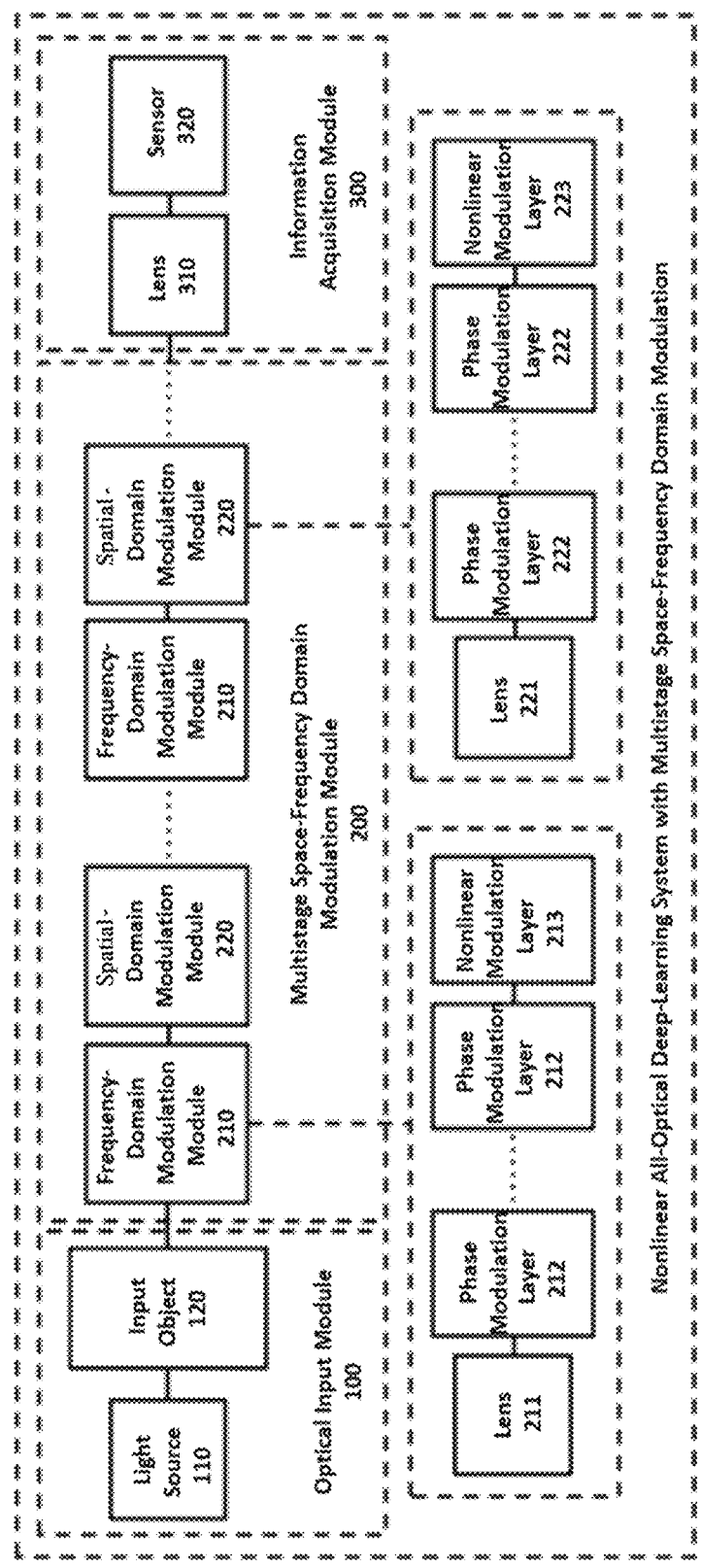
FIG. 1 is a schematic block diagram of nonlinear all-optical deep-learning system with multistage space-frequency domain modulation according to an embodiment of the present disclosure.

FIG. 1 is a schematic block diagram of nonlinear all-optical deep-learning system with multistage space-frequency domain modulation according to an embodiment of the present disclosure.

As illustrated in FIG. 1, the system includes an optical input module 100, a multistage space-frequency domain modulation module 200, and an information acquisition module 300.

The optical input module 100 is configured to convert input information to optical information.

The multistage space-frequency domain modulation module 200 is configured to perform multistage space-frequency domain modulation on the optical information generated by the optical input module 100 so as to generate modulated optical information The information acquisition module 300 is configured to transform the modulated optical information onto a Fourier plane or an image plane, and to acquire the transformed optical information so as to generate processed optical information.

As illustrated in FIG. 1, the optical input module 100 includes a light source 110 and an input object 120.

Light emitted from the light source 110 irradiates the input object 120 uniformly, such that the light transmits through the input object 120 or is reflected by the input object 120, to convert information of the input object 120 to the optical information of the transmitted light or the reflected light. For example, the optical information includes intensity of the light, phase of the light, or the like.

In an embodiment, the input object 120 may be implemented with a spatial light modulator.

In an alternative embodiment, the input object 120 may be an object obtained through 3D printing. In this case, the information of the input object 120 may be image information of the object obtained through 3D printing, In some embodiments, normalized gray values of the image of the input object 120 may be obtained as the intensity of the light inputted to the multistage space-frequency domain modulation module 200.

The multistage space-frequency domain modulation module 200 may include one or more frequency-domain modulation module 210 configured to perform frequency-domain modulation on optical information in Fourier space, and/or one or more spatial-domain modulation module 220 configured to perform spatial-domain modulation on optical information in spatial domain. The one or more frequency-domain modulation module 210 and/or the one or more spatial-domain modulation module 220 may be cascaded alternately, so as to implement multistage space-frequency domain modulation of optical information.

Figure 2:
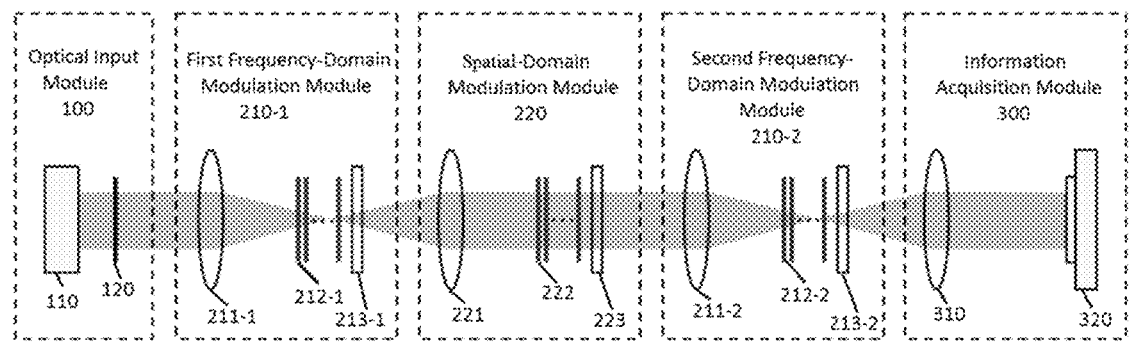
FIG. 2 is a schematic diagram showing an optical structure of the nonlinear all-optical deep-learning system with multistage space-frequency domain modulation according to an embodiment of the present disclosure, which includes two frequency-domain modulation modules and one spatial-domain modulation module.

For example, in an embodiment of the present disclosure, as shown in FIG. 2, the multistage space-frequency domain modulation module 200 may include 3 modulation modules, in which two frequency-domain modulation modules 210 (i.e., a first frequency-domain modulation module 210-1 and a second frequency-domain modulation module 210-2), and one spatial-domain modulation module 220 are cascaded alternately.

In the embodiments according to the present disclosure, when the multistage space-frequency domain modulation module 200 includes the one or more frequency-domain modulation module 210 and the one or more spatial-domain modulation module 220, they may be cascaded alternately in the following way based on the propagation process of light in the system. That is, the modulation module at each odd-numbered stage is set to be the frequency-domain modulation module, and the modulation module at each even-numbered stage is set to be the spatial-domain modulation module.

For example, in an embodiment of the present disclosure, as shown in FIG. 2, the modulation module at the first and third stages are the first frequency-domain modulation module 210-1 and the first frequency-domain modulation module 210-2, respectively, while the modulation module at the second stage is the spatial-domain modulation module 220.

Further, in the embodiments according to the present disclosure, if the total number of the modulation modules in the multistage space-frequency domain modulation module 200 is an odd number, the last stage of the multistage space-frequency domain modulation module 200 may be set to be the frequency-domain modulation module 210. In this way, the multistage space-frequency domain modulation module 200 may perform multistage space-frequency domain modulation on the optical information generated by the optical input module 100, to generate modulated optical information in Fourier space. Then, the modulated optical information may be transformed to spatial domain through the information acquisition module 300 for acquisition.

Further, if the total number of the modulation modules in the multistage space-frequency domain modulation module 200 is an even number, the last stage of the multistage space-frequency domain modulation module 200 may be set to be the spatial-domain modulation module 220. In this way, the multistage space-frequency domain modulation module 200 may perform multistage space-frequency domain modulation on the optical information generated by the optical input module 100, to generate modulated optical information in spatial domain. Then, the modulated optical information may be transformed to Fourier space through the information acquisition module 300 for acquisition.

For example, in an embodiment of the present disclosure, as shown in FIG. 2, the total number of the modulation modules in the multistage space-frequency domain modulation module 200 is three, which is an odd number. Therefore, the last stage of the multistage space-frequency domain modulation module 200 is set to be the frequency-domain modulation module 210. Further, a sensor 320 acquires the optical information that has been transformed to spatial domain.

Further, in some embodiments, the multistage space-frequency domain modulation module 200 only includes one or more frequency-domain modulation module 210, or only includes one or more spatial-domain modulation module 220.

Figure 4:
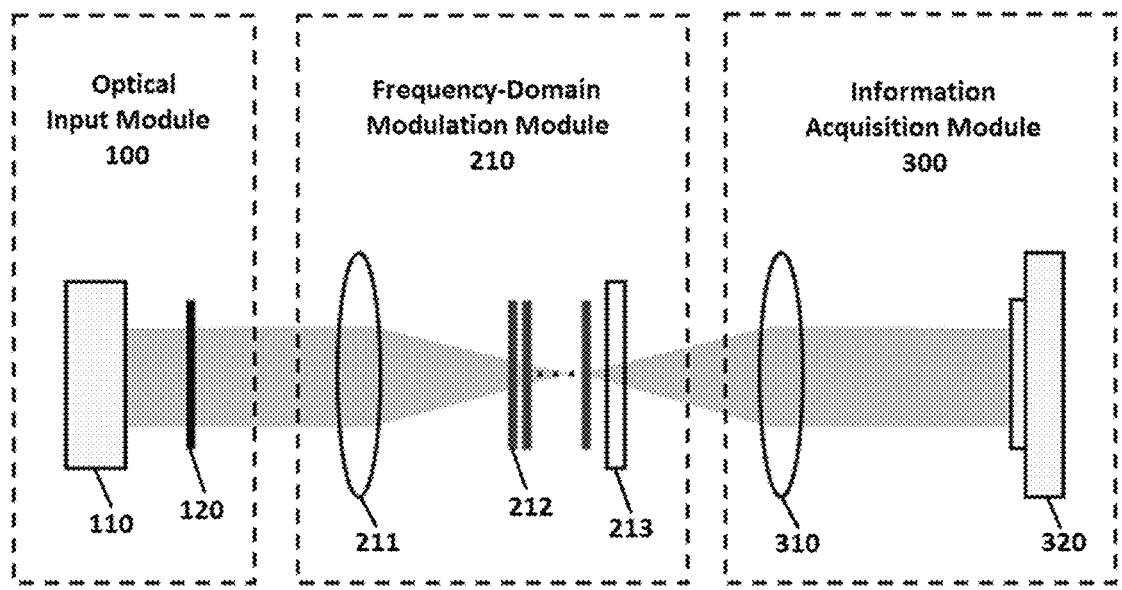
FIG. 4 is a schematic diagram showing an optical structure of the nonlinear all-optical deep-learning system with multistage space-frequency domain modulation according to an embodiment of the present disclosure, which includes only one frequency-domain modulation module.

For example, in an embodiment of the present disclosure, as shown in FIG. 4, the multistage space-frequency domain modulation module 200 may be simplified as only including one frequency-domain modulation module 210, and not including any spatial-domain modulation module 220. In this structure, the optical information generated by the optical input module 100 is modulated by the frequency-domain modulation module 210, to generate modulated optical information in Fourier space. Then, the modulated optical information may be transformed to spatial domain through the information acquisition module 300 for acquisition. It is noted that the number of the frequency-domain modulation module 210 is not limited to one, and the multistage space-frequency domain modulation module 200 may include a plurality of frequency-domain modulation modules 210 without any spatial-domain modulation module 220.

Figure 5:
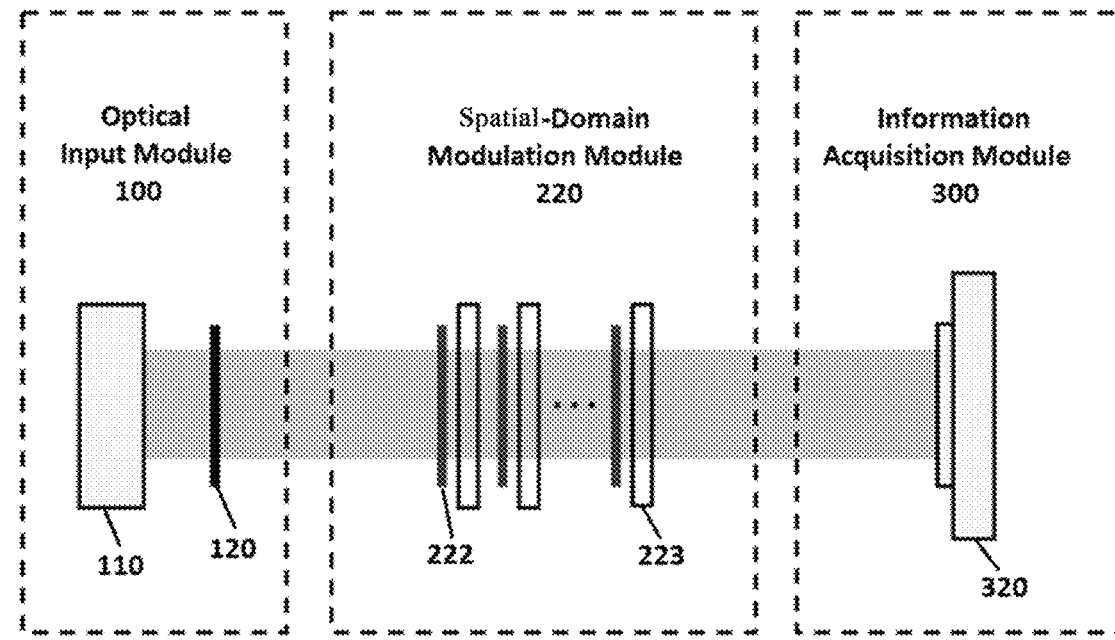
FIG. 5 is a schematic diagram showing an optical structure of the nonlinear all-optical deep-learning system with multistage space-frequency domain modulation according to an embodiment of the present disclosure, which includes only one spatial-domain modulation module.

Further, in an embodiment of the present disclosure, as shown in FIG. 5, the multistage space-frequency domain modulation module 200 may only include one spatial-domain modulation module 220, and not includes any frequency-domain modulation module 210. In this structure, the optical information generated by the optical input module 100 is modulated by spatial-domain modulation module 220, to generate modulated optical information in spatial domain. Then, the modulated optical information may be transformed to Fourier space through the information acquisition module 300 for acquisition.

Figure 6:
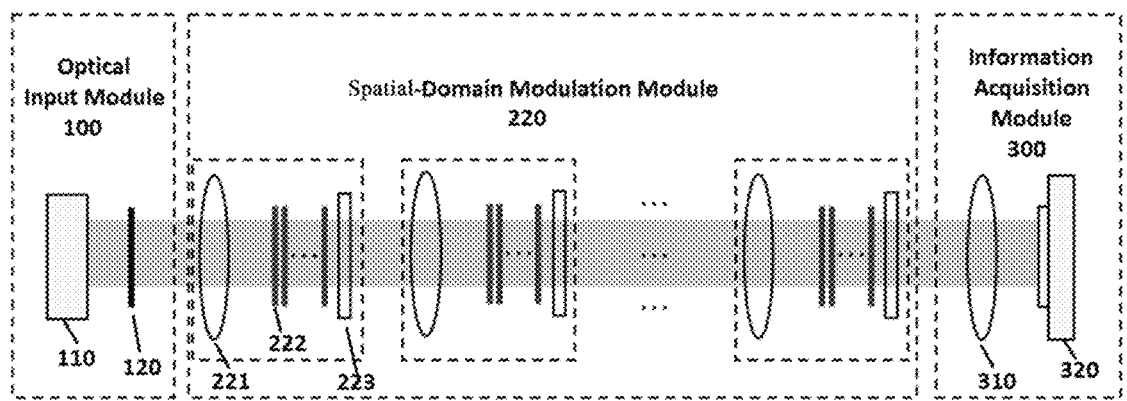
FIG. 6 is a schematic diagram showing an optical structure of the nonlinear all-optical deep-learning system with multistage space-frequency domain modulation according to an embodiment of the present disclosure, which includes only a plurality of spatial-domain modulation modules.

Further, in an embodiment of the present disclosure, as shown in FIG. 6, the multistage space-frequency domain modulation module 200 may include a plurality of spatial-domain modulation modules 220, and not includes any frequency-domain modulation module 210.

Returning to FIG. 1, the frequency-domain modulation module 210 may include a frequency-domain modulation lens 211, a frequency-domain phase modulation layer 212, and a nonlinear modulation layer 213.

The frequency-domain modulation lens 211 is configured to perform Fourier transformation on the optical information in spatial domain received from a previous stage (such as the optical input module or a spatial-domain modulation module 220) so as to transform the optical information into Fourier space. The frequency-domain phase modulation layer 212 is configured to perform phase modulation on the optical information in Fourier space. The nonlinear modulation layer 212 is configured to perform nonlinear modulation on the phase-modulated optical information by using electro-optical effect and photorefractive effect of crystal, to implement nonlinear processing of the optical information.

Similarly, the spatial-domain modulation module 220 may include a spatial-domain modulation lens 221, a spatial-domain phase modulation layer 222, and a nonlinear modulation layer 223.

The spatial-domain modulation lens 221 is configured to perform transformation on the optical information in Fourier domain received from a previous stage (such as the frequency-domain modulation module 210) so as to transform the optical information into spatial domain. The spatial-domain phase modulation layer 222 is configured to perform phase modulation on the optical information in spatial domain. The nonlinear modulation layer 222 is configured to perform nonlinear modulation on the phase-modulated optical information by using electro-optical effect and photorefractive effect of crystal, to implement nonlinear processing of the optical information.

In each modulation module (the frequency-domain modulation module 210 or the spatial-domain modulation module 220), the frequency-domain modulation lens 211 or the spatial-domain modulation lens 221 may be a phase converter having a pupil, an equivalent phase transformation function of which, for example, may be expressed by the following equation:

$$t(x, y) = \exp\left[-j\frac{k}{2f}(x^2 + y^2)\right] \cdot P(x, y) \quad \text{(Equation 1)}$$

wherein, k represents a wave number of light, f represents a focal length of lens, and $$P(x, y) = \begin{cases} 1, & \text{within the aperture of lens;} \\ 0, & \text{otherwise} \end{cases}.$$

In each modulation module (the frequency-domain modulation module 210 or the spatial-domain modulation module 220), the phase modulation layers 212, 222 may be a single diffraction layer or a lamination of a plurality of diffraction layers.

Although the frequency-domain modulation module 210 and the spatial-domain modulation module 220 are illustrated as including multiple phase modulation layers 212, 222 and one nonlinear modulation layer 213, 223, respectively, in the embodiment shown in FIG. 1, the frequency-domain modulation module 210 and the spatial-domain modulation module 220 may include one or more phase modulation layer 212, 222 and one or more nonlinear modulation layer 213, 223, respectively, in some embodiments. Further, in some embodiments, the frequency-domain modulation module 210 or the spatial-domain modulation module 220 may even not include the nonlinear modulation layer 213, 223.

Figure 3:
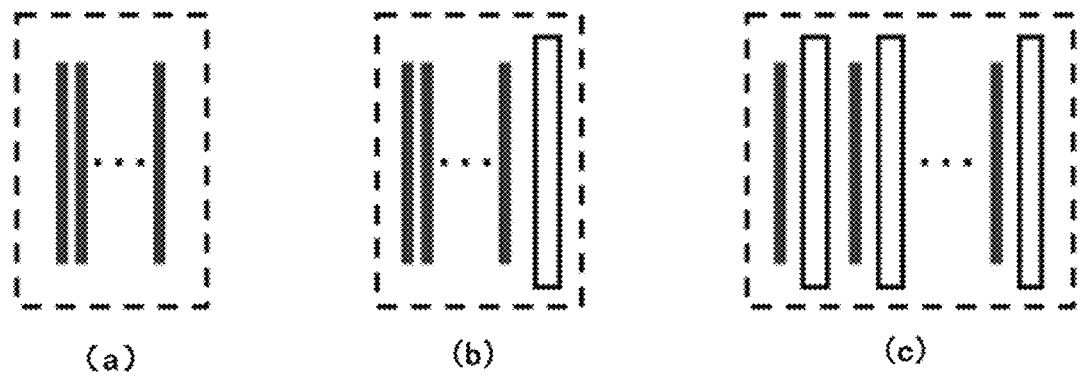
FIG. 3 is a schematic diagram of various combinations of phase modulation layer(s) and nonlinear modulation layer(s) according to the embodiments of the present disclosure.

For example, in an embodiment of the present disclosure, as shown in part (a) of FIG. 3, the frequency-domain modulation module 210 or the spatial-domain modulation module 220 may only include a plurality of laminated phase modulation layers without the nonlinear modulation layer. In the drawing, a black vertical strip represents the phase modulation layer.

Further, in an embodiment of the present disclosure, as shown in part (b) of FIG. 3, the frequency-domain modulation module 210 or the spatial-domain modulation module 220 may include a plurality of laminated phase modulation layers and one nonlinear modulation layer. In the drawing, the black vertical strip represents the phase modulation layer, and a white hollow vertical strip represents the nonlinear modulation layer. As illustrated, the one nonlinear modulation layer is disposed at a rear side of the plurality of laminated phase modulation layers with respect to the lens.

Further, in an embodiment of the present disclosure, as shown in part (c) of FIG. 3, the frequency-domain modulation module 210 or the spatial-domain modulation module 220 may include a plurality of phase modulation layers and a plurality of nonlinear modulation layers. In the drawing, the black vertical strip represents the phase modulation layer, and a white hollow vertical strip represents the nonlinear modulation layer. As illustrated, the plurality of phase modulation layers and the plurality of nonlinear modulation layers are laminated alternately. That is, one nonlinear modulation layer is disposed at a rear side of each of the phase modulation layers with respect to the lens.

Further, it is noted that the frequency-domain modulation module 210 or the spatial-domain modulation module 220 in the examples shown in FIGS. 2, 4, and 6 adopts a structure including a plurality of laminated phase modulation layers and one nonlinear modulation layer. Further, the frequency-domain modulation module 210 or the spatial-domain modulation module 220 in the example shown in FIG. 5 adopts a structure in which a plurality of phase modulation layers and a plurality of nonlinear modulation layers are laminated alternately, and the information acquisition lens 310 is omitted. However, it is understood that the above examples are only illustrative, and the frequency-domain modulation module 210 or the spatial-domain modulation module 220 may adopt any combination of the embodiments according to the present disclosure. For example, the combination of the phase modulation layer(s) and the nonlinear modulation layer(s) may be selected from those shown in parts (a)-(c) of FIG. 3.

In the embodiments according to the present disclosure, the phase modulation layers 212, 222 may be manufactured physically through 3D printing or lithography, or may be implemented with a spatial light modulator. Parameters of the phase modulation layers 212, 222 may be optimized through a deep-learning method.

In the embodiments according to the present disclosure, the nonlinear modulation layers 213, 223 may be formed of SBN photorefractive crystal or similar optical element, so as to perform nonlinear modulation on the optical information by using electro-optical effect and photorefractive effect of photorefractive crystal.

Specifically, the variation $\Delta n$ of crystal refractive index of the SBN photorefractive crystal under external electric field and light may be expressed by the following equation:

$$\Delta n = \frac{n_0 r_{33}(1 + I_0)EI}{1 + I} \quad \text{(Equation 2)}$$

wherein, $n_0$ represents an original refractive index of crystal, $r_{33}$ represents an electro-optical coefficient of the crystal, $I_0$ represents intensity of light in background, E represents intensity of electric field applied across the crystal, and I represents disturbance of a crystal surface on spatially-homogeneous intensity of background.

Returning to FIG. 1 again, the information acquisition module 300 may include an information acquisition lens 310 and a sensor 320.

The information acquisition lens 310 is configured to perform Fourier transformation on the modulated optical information so as to transform it onto the Fourier plane or the image plane. The sensor 320 is configured to acquire the transformed optical information so as to generate the processed optical information.

It is noted that the positions of respective components in the nonlinear all-optical deep-learning system with multistage space-frequency domain modulation according to the embodiments of the present disclosure may be arranged according to a Fourier transformation relationship between those components in the whole system, so that the phase modulation layer, the nonlinear modulation layer and the sensor may be located in the image plane or in the Fourier plane. For example, the Fourier transformation relationship may be present between two modules in the front and rear focal planes of the lens.

For example, as shown in FIG. 2, the nonlinear all-optical deep-learning system with multistage space-frequency domain modulation according to the embodiments of the present disclosure may include the optical input module 100, the multistage space-frequency domain modulation module 200, and the information acquisition module 300. In this embodiment, the multistage space-frequency domain modulation module 200 may include a first frequency-domain modulation module 210-1 as the first-stage modulation module, a spatial-domain modulation module 220 as the second-stage modulation module, and a second frequency-domain modulation module 210-2 as the third-stage modulation module that are cascaded alternately.

In the optical input module 100, the input object 120 may be arranged at the front focal plane of a first frequency-domain modulation lens 211-1 in the first frequency-domain modulation module 210-1.

Further, in the first frequency-domain modulation module 210-1 as the first-stage modulation module in the multistage space-frequency domain modulation module 200, a frequency-domain phase modulation layer 212-1 is arranged to be close to a nonlinear modulation layer 213-1 spatially in the first frequency-domain modulation module 210-1 (the former-stage module). Further, the frequency-domain phase modulation layer 212-1 and the nonlinear modulation layer 213-1 in the first frequency-domain modulation module 210-1 are arranged in the vicinity of the rear focal plane of the first frequency-domain modulation lens 211-1 (the former-stage lens) in the first frequency-domain modulation module 210-1, and also in the vicinity of the front focal plane of a spatial-domain modulation lens 221 (the latter-stage lens) in the spatial-domain modulation module 220 (the latter-stage module).

Similarly, in the spatial-domain modulation module 220 as the second-stage modulation module in the multistage space-frequency domain modulation module 200, a spatial-domain phase modulation layer 222 is arranged to be close to a nonlinear modulation layer 223 spatially in the spatial-domain modulation module 220 (the former-stage module). Further, the spatial-domain phase modulation layer 222 and the nonlinear modulation layer 223 in the spatial-domain modulation module 220 are arranged in the vicinity of the rear focal plane of a spatial-domain modulation lens 221 (the former-stage lens) in the spatial-domain modulation module 220, and also in the vicinity of the front focal plane of a second frequency-domain modulation lens 211-2 (the latter-stage lens) in the second frequency-domain modulation module 210-2 (the latter-stage module).

Similarly, in the second frequency-domain modulation module 210-2 as the last-stage modulation module in the multistage space-frequency domain modulation module 200, a frequency-domain phase modulation layer 212-2 is arranged to be close to a nonlinear modulation layer 213-2 spatially in the second frequency-domain modulation module 210-2. Further, the frequency-domain phase modulation layer 212-2 and the nonlinear modulation layer 213-2 in the second frequency-domain modulation module 210-2 are arranged in the vicinity of the front focal plane of the information acquisition lens 310 in the information acquisition module 300. Here, the sensor 320 in the information acquisition module 300 is arranged in the vicinity of the rear focal plane of the information acquisition lens 310.

It can be seen from the above that, as compared with conventional all-optical diffraction-depth neural networks which implement computation functionality merely by performing optical modulation in spatial domain with a lamination of diffraction layers, the nonlinear all-optical deep-learning system with multistage space-frequency domain modulation according to the embodiment of the present disclosure provides the multistage space-frequency domain modulation module by alternately cascading one or more frequency-domain modulation modules and spatial-domain modulation modules, which may effectively improve the computation capability. In addition, the nonlinear all-optical deep-learning system with multistage space-frequency domain modulation according to the embodiment of the present disclosure may perform Fourier transformation on the optical information with a lens, perform phase modulation with a phase modulation layer manufactured physically, and perform nonlinear modulation with a nonlinear modulation layer formed of photorefractive crystal, within a single modulation module (i.e., the frequency-domain modulation module or the spatial-domain modulation module), thereby enabling complex information processing functions. In particular, the nonlinear all-optical deep-learning system with multistage space-frequency domain modulation according to the embodiment of the present disclosure may incorporate the nonlinear modulation layer formed of nonlinear optical devices such as photorefractive crystal, enabling the learning system to implement more complex nonlinear information processing tasks.

With the nonlinear all-optical deep-learning system with multistage space-frequency domain modulation according to the embodiments of the present disclosure, some functions based on the neural network may be executed by using the optical elements at a speed of light, thereby creating an effective and quick mode to implement machine learning tasks. Additionally, the system may be easily extended by using various optical elements and detection systems with high-throughput and large area and based on 3D manufacturing methods and a wide field, and thus may implement a large-scale neural network economically and efficiently in an extensible manner with low power-consumption, thereby having a potential to implement various complex applications.

Figure 7:
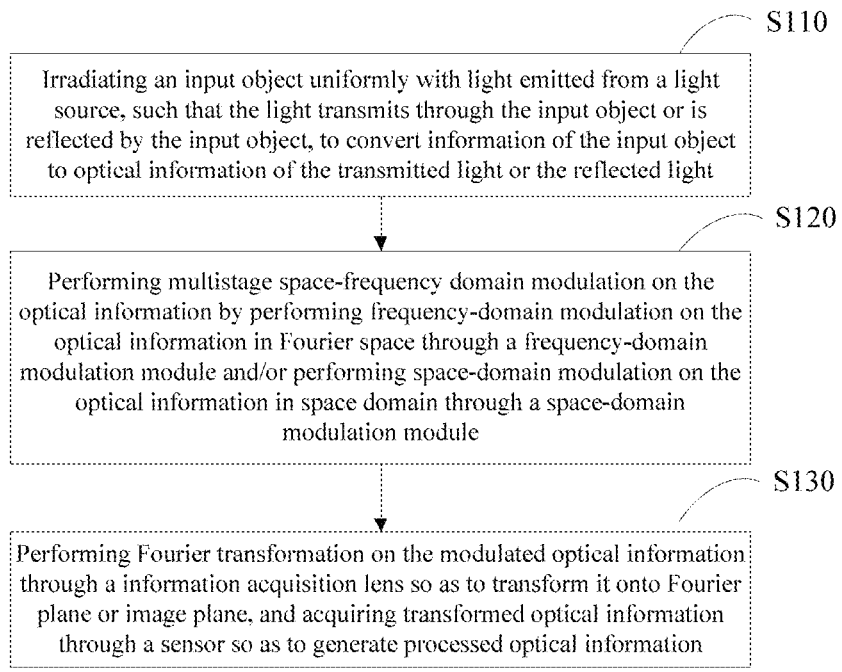
FIG. 7 is a flow diagram of a method for performing information processing in the nonlinear all-optical deep-learning system with multistage space-frequency domain modulation according to an embodiment of the present disclosure.

FIG. 7 is a flow diagram of a method for performing information processing in the nonlinear all-optical deep-learning system with multistage space-frequency domain modulation according to an embodiment of the present disclosure.

At step S110, the light emitted from the light source 110 irradiates the input object 120 uniformly, such that the light transmits through the input object 120 or is reflected by the input object 120, to convert information of the input object 120 to the optical information of the transmitted light or the reflected light. For example, the optical information includes intensity of the light, phase of the light, or the like.

At step S120, the multistage space-frequency domain modulation is performed on the optical information by performing frequency-domain modulation on the optical information in Fourier space through the frequency-domain modulation module 210 and/or performing spatial-domain modulation on the optical information in spatial domain through spatial-domain modulation module 220.

At step S130, Fourier transformation is performed on the modulated optical information through the information acquisition lens 310 so as to transform it onto the Fourier plane or the image plane. Then, the transformed optical information is acquired through the sensor 320 so as to generate the processed optical information.

Figure 8:
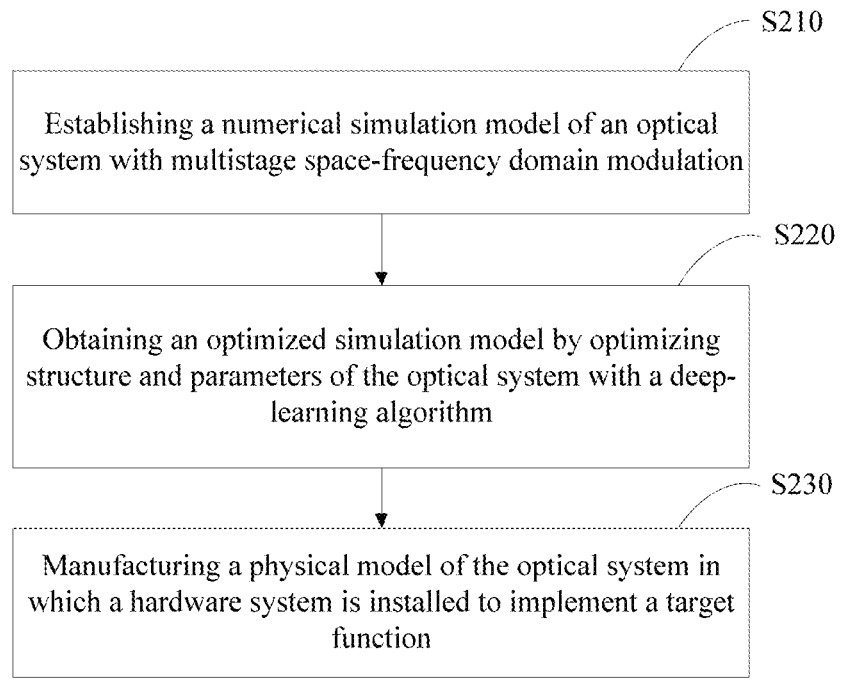
FIG. 8 is a flow diagram of a nonlinear all-optical deep-learning method with multistage space-frequency domain modulation according to an embodiment of the present disclosure.

Next, the nonlinear all-optical deep-learning method with multistage space-frequency domain modulation according to an embodiment of the present disclosure will be described below with reference to FIG. 8.

At step S210, a numerical simulation model of an optical system with multistage space-frequency domain modulation is established.

The system includes the optical input module 100 configured to convert input information to optical information, the multistage space-frequency domain modulation module 200 configured to perform multistage space-frequency domain modulation on the optical information generated by the optical input module 100 so as to generate modulated optical information, and the information acquisition module 300 configured to transform the modulated optical information onto a Fourier plane or an image plane and to acquire the transformed optical information so as to generate processed optical information.

Specifically, a wavelength of the light source 110 in the optical input module 100 may be set. Normalized gray values of an image of the input object 120 may be obtained as the intensity of the light inputted to the multistage space-frequency domain modulation module, by irradiating the input object 120 uniformly with light emitted from the light source 110. The inputted light may be modulated through the multistage space-frequency domain modulation module 200 and acquired in the information acquisition module 300. Here, one or more frequency-domain modulation module and/or one or more spatial-domain modulation module may be cascaded alternately in the multistage space-frequency domain modulation module.

In each modulation module (the frequency-domain modulation module 210 or the spatial-domain modulation module 220), the frequency-domain modulation lens 211 or the spatial-domain modulation lens 221 may be a phase converter having a pupil, an equivalent phase transformation function of which, for example, may be expressed by the above equation (1).

In each modulation module (the frequency-domain modulation module 210 or the spatial-domain modulation module 220), the phase modulation layers 212, 222 may be a single diffraction layer or a lamination of a plurality of diffraction layers, each diffraction layer implementing the simulation through phase modulation and Fresnel propagation over a given spatial distance.

In each modulation module (the frequency-domain modulation module 210 or the spatial-domain modulation module 220), the nonlinear modulation layer 213, 223 may be simulated by utilizing the electro-optic effect and photorefractive effect of the SBN photorefractive crystal.

Specifically, the variation $\Delta n$ of the crystal refractive index of the SBN photorefractive crystal under external electric field and light may be expressed by the above equation (2).

In the above system, propagation of light in all free space and homogeneous media may be simulated with Fresnel propagation.

At step S220, an optimized simulation model is obtained by optimizing structure and parameters of the optical system with a deep-learning algorithm.

Figure 9:
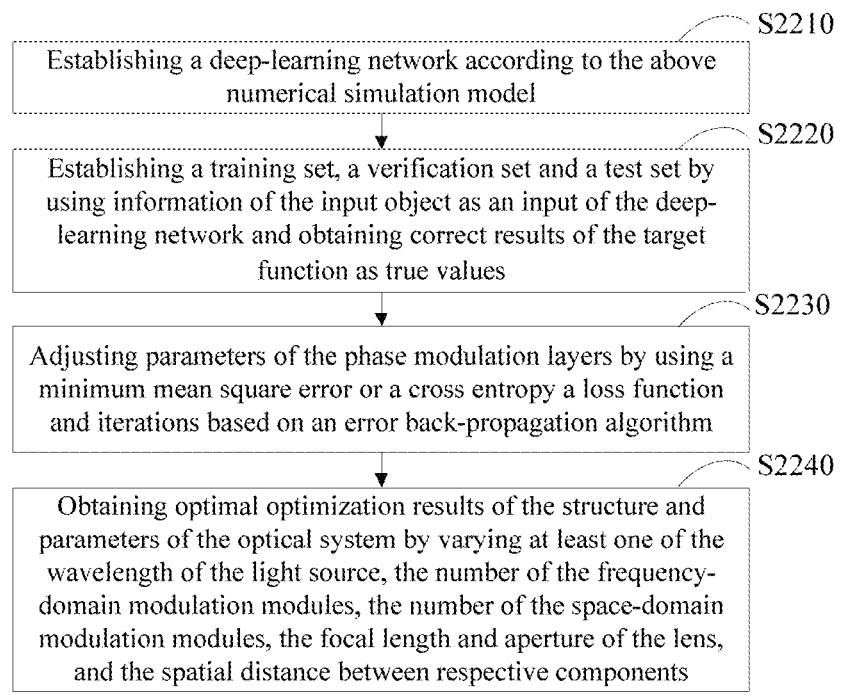
FIG. 9 is a flow diagram of a method for optimizing structure and parameters of the optical system with a deep-learning algorithm according to an embodiment of the present disclosure.

As shown in FIG. 9, step S220 may further include the following sub-steps.

At sub-step S2210, a deep-learning network is established according to the above numerical simulation model.

At sub-step S2220, a training set, a verification set and a test set is established by using information of the input object 120 as an input of the deep-learning network and obtaining correct results of the target function as ground truth.

At sub-step S2230, parameters of the phase modulation layers 212, 222 is adjusted, for example, by using a minimum mean square error or a cross entropy a loss function and iterations based on an error back-propagation algorithm.

At sub-step S2240, optimal optimization results of the structure and parameters of the optical system is obtained by varying at least one of the parameters such as the wavelength of the light source 110, the number of the frequency-domain modulation modules 210, the number of the spatial-domain modulation modules 220, the focal length and aperture of the lenses 211, 221, 310, and the spatial distance between respective components, thereby obtaining an optimized simulation model.

For example, with reference to the embodiment shown in FIG. 2, the input object 120 may be arranged at the front focal plane of the first frequency-domain modulation lens 211-1 in the first frequency-domain modulation module 210-1. The phase modulation layers 212-1, 222 in the former-stage module is arranged to be close to the nonlinear modulation layer 213-1, 223 spatially, respectively. Further, the phase modulation layers 212-1, 222 and the nonlinear modulation layer 213-1, 223 are arranged respectively in the vicinity of the rear focal plane of the former-stage lenses 211-1, 222 in the former-stage modules 210-1, 220, and also in the vicinity of the front focal plane of the latter-stage lenses 221, 211-2 in the latter-stage module. Further, the phase modulation layer 212-2 in the last-stage modulation module 210-2 is arranged to be close to the nonlinear modulation layer 213-2 spatially. Further, the phase modulation layer 212-2 and the nonlinear modulation layer 213-2 are arranged in the vicinity of the front focal plane of the information acquisition lens 310 in the information acquisition module 300, and the sensor 320 in the information acquisition module 300 is arranged in the vicinity of the rear focal plane of the information acquisition lens 310.

At step S230, a physical model of the optical system in which a hardware system is installed is manufactured to implement a target function.

Specifically, the phase modulation layer is manufactured physically through 3D printing or lithography technology according to the optimized structure and parameters of the optical system obtained in step S220. Further, the hardware system correctly by selecting the light source, the lens or the photorefractive crystal according to the optimized simulation model to implement the target function of all-optical deep learning. By irradiating the 3D-printed input object with uniform light, the transmitted light or reflected light carrying information of the object may be modulated through multistage space-frequency domain modulation, and is acquired by the sensor in the information acquisition module, resulting in a processed result of the input information.

It can be seen from the above that, as compared with conventional all-optical diffraction-depth neural networks which implement computation functionality merely by performing optical modulation in spatial domain with a lamination of diffraction layers, the nonlinear all-optical deep-learning method with multistage space-frequency domain modulation according to the embodiment of the present disclosure provides the multistage space-frequency domain modulation module by alternately cascading one or more frequency-domain modulation modules and spatial-domain modulation modules, which may effectively improve the computation capability. In addition, the nonlinear all-optical deep-learning method with multistage space-frequency domain modulation according to the embodiment of the present disclosure may perform Fourier transformation on the optical information with a lens, perform phase modulation with a phase modulation layer manufactured physically, and perform nonlinear modulation with a nonlinear modulation layer formed of photorefractive crystal, within a single modulation module (i.e., the frequency-domain modulation module or the spatial-domain modulation module), thereby enabling complex information processing functions. In particular, the nonlinear all-optical deep-learning method with multistage space-frequency domain modulation according to the embodiment of the present disclosure may incorporate the nonlinear modulation layer formed of nonlinear optical devices such as photorefractive crystal, enabling the learning system to implement more complex nonlinear information processing tasks.

It is noted that the above description with respect to some embodiments of the nonlinear all-optical deep-learning system with multistage space-frequency domain modulation according to an embodiment of the present disclosure may also be applied to the method in this embodiment, details of which is thus omitted here.

With the nonlinear all-optical deep-learning method with multistage space-frequency domain modulation according to the embodiments of the present disclosure, some functions based on the neural network may be executed by using the optical elements at a speed of light, thereby creating an effective and quick mode to implement machine learning tasks. Additionally, the system may be easily extended by using various optical elements and detection systems with high-throughput and large area and based on 3D manufacturing methods and a wide field, and thus may implement a large-scale neural network economically and efficiently in an extensible manner with low power-consumption, thereby having a potential to implement various complex applications.

The nonlinear all-optical deep-learning system and method with multistage space-frequency domain modulation according to the embodiments of the present disclosure exhibit much better performance than the conventional all-optical diffraction-depth neural network in a number of experiments such as handwritten digit image classification, image Laplace operation, image significance detection, or the like, which proves its huge advantages in complex operation and nonlinear tasks.

Figure 10:
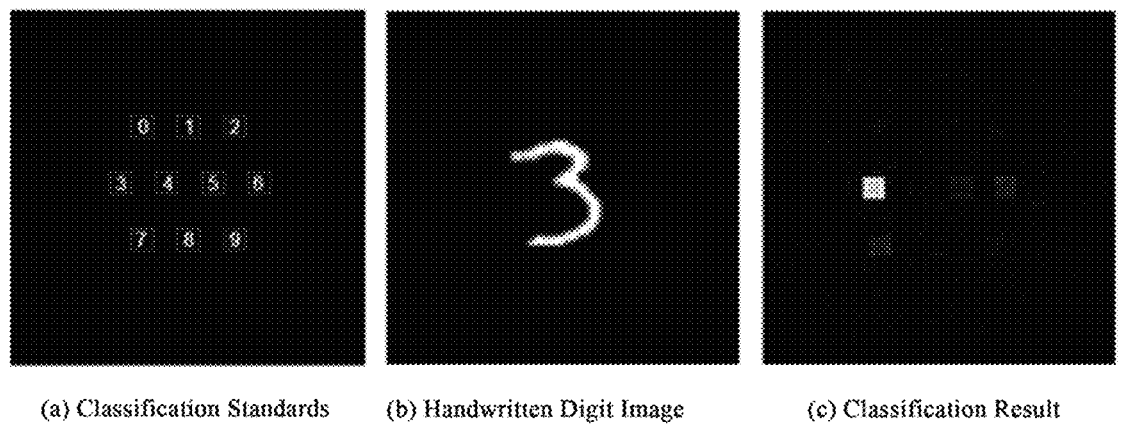
FIG. 10 is a simulation effect diagram for implementing a handwritten digit image classification function through the nonlinear all-optical deep-learning system and method with multistage space-frequency domain modulation according to an embodiment of the present disclosure.

FIG. 10 is a simulation effect diagram for implementing a handwritten digit image classification function through the nonlinear all-optical deep-learning system and method with multistage space-frequency domain modulation according to an embodiment of the present disclosure.

In the embodiment shown in FIG. 10, MNIST handwritten digit images are classified. MNIST is a data set for handwritten digit recognition, which is often used as primary samples for deep learning.

Figure 11:
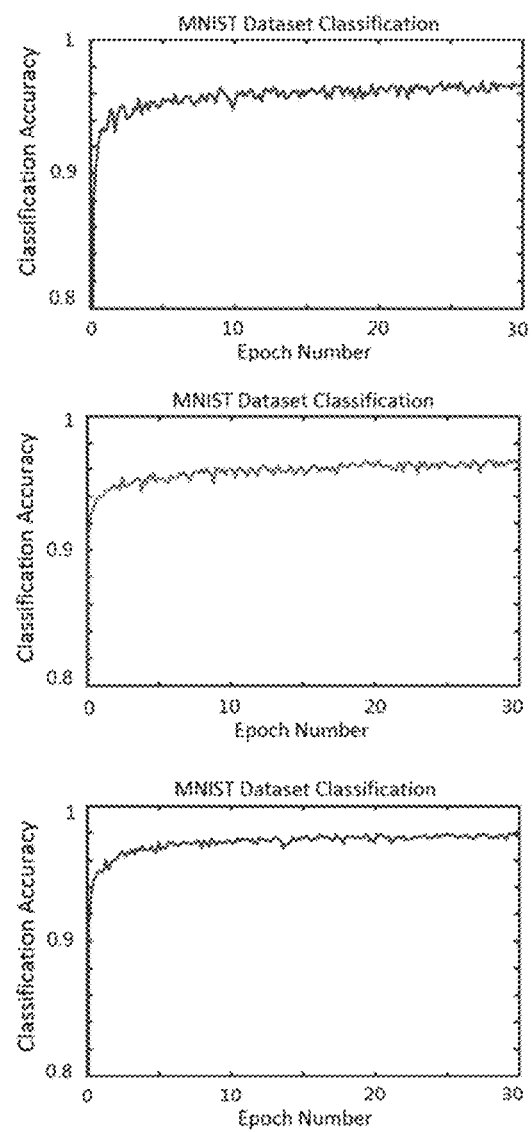
FIG. 11 is a training result of the handwritten digit image classification function implemented by the nonlinear all-optical deep-learning system with multistage space-frequency domain modulation according to an embodiment of the present disclosure.

Part (a) of FIG. 11 shows the classification criteria.

Part (b) of FIG. 10 shows an input handwritten digit image, e.g., 3.

Part (c) of FIG. 10 shows the classification result. In the classification result, a bright area in the drawing indicates the position of the input handwritten digit image"3" in the classification standard shown in part (a) of FIG. 10.

FIG. 11 is a training result of the handwritten digit image classification function implemented by the nonlinear all-optical deep-learning system with multistage space-frequency domain modulation according to an embodiment of the present disclosure.

Parts (a), (b) and (c) of FIG. 11 show the training results when the structures shown in FIGS. 4, 5 and 6 are applied to the nonlinear all-optical deep-learning system with multistage space-frequency domain modulation, respectively. As shown, the classification accuracy exhibited in the simulation results for the handwritten digit image classification function in the three structures of the system may reach 97.0%, 96.8% and 98.1% respectively.

Figure 12:
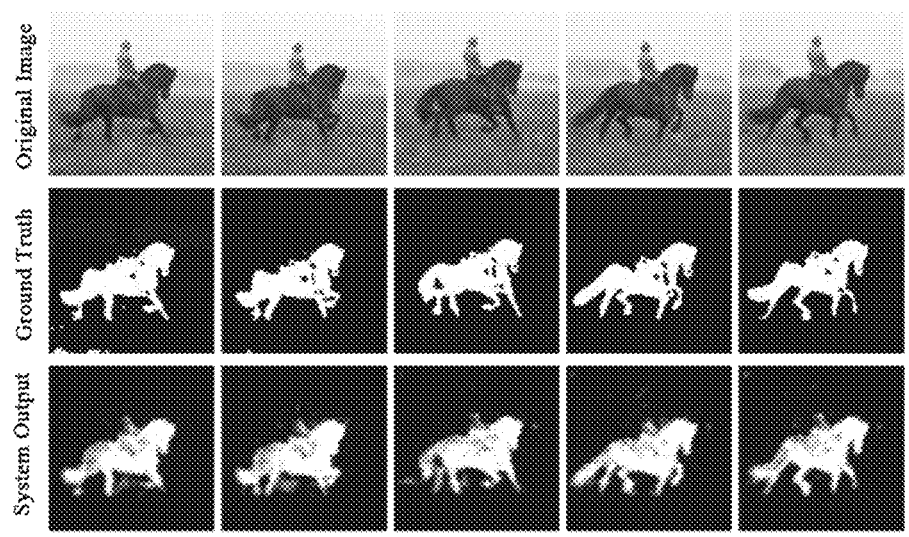
FIG. 12 is a simulation effect diagram for implementing a significance detection function for a macroscopic image through the nonlinear all-optical deep-learning system and method with multistage space-frequency domain modulation according to an embodiment of the present disclosure.

FIG. 12 is a simulation effect diagram for implementing a significance detection function for a macroscopic image through the nonlinear all-optical deep-learning system and method with multistage space-frequency domain modulation according to an embodiment of the present disclosure.

As an example, the nonlinear all-optical deep-learning system and method with multistage space-frequency domain modulation adopts the structure shown in FIG. 4.

Figure 13:
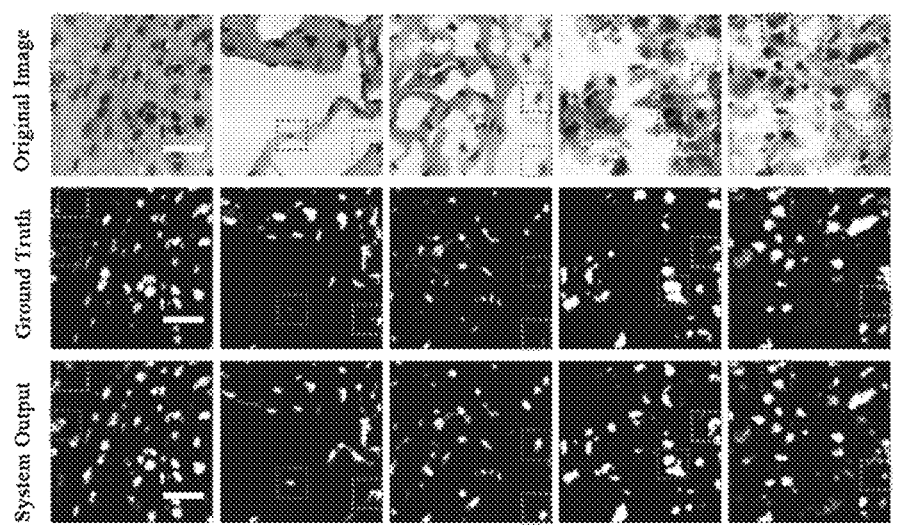
FIG. 13 is a simulation effect diagram for implementing a significance detection function for a microscopic image of a cell pathological section through the nonlinear all-optical deep-learning system and method with multistage space-frequency domain modulation according to an embodiment of the present disclosure.

In FIG. 13, the first line shows a series of original images in which a person is riding a horse; the second line shows ground truth corresponding to respective original images; and the third line shows the system output of the nonlinear all-optical deep-learning system and method with multistage space-frequency domain modulation.

As shown in FIG. 12, when the significance detection is performed on a macroscopic image by utilizing the nonlinear all-optical deep-learning system and method with multistage space-frequency domain modulation according to the embodiment of the present disclosure, all of the simulation results exhibit good effects in significance segmentation.

FIG. 13 is a simulation effect diagram for implementing a significance detection function for a microscopic image of a cell pathological section through the nonlinear all-optical deep-learning system and method with multistage space-frequency domain modulation according to an embodiment of the present disclosure.

Similarly, the nonlinear all-optical deep-learning system and method with multistage space-frequency domain modulation also adopts the structure shown in FIG. 4.

In FIG. 14, the first line shows a series of original images of the microscopic image of the cell pathological section; the second line shows ground truth corresponding to respective original images; and the third line shows the system output of the nonlinear all-optical deep-learning system and method with multistage space-frequency domain modulation.

As shown in FIG. 13, when the significance detection is performed on the microscopic image of the cell pathological section by utilizing the nonlinear all-optical deep-learning system and method with multistage space-frequency domain modulation according to the embodiment of the present disclosure, all of the simulation results exhibit good effects in significance segmentation.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of present disclosure have been shown and described above, it should be understood that above embodiments are just explanatory, and cannot be construed to limit the present disclosure, for those skilled in the art, changes, modifications, alternatives, and variations can be made to the embodiments within the scope of the present disclosure.

What is claimed is:

1. A nonlinear all-optical deep-learning system with multistage space-frequency domain modulation, comprising:
   an optical input module, configured to convert input information to optical information;
   a multistage space-frequency domain modulation module, configured to perform multistage space-frequency domain modulation on the optical information generated by the optical input module so as to generate modulated optical information; and
   an information acquisition module, configured to transform the modulated optical information onto a Fourier plane or an image plane, and to acquire the transformed optical information so as to generate processed optical information;
   wherein the multistage space-frequency domain modulation module comprises:
   one or more frequency-domain modulation module, configured to perform frequency-domain modulation on optical information in Fourier space; and
   one or more spatial-domain modulation module, configured to perform spatial-domain modulation on optical information in spatial domain,
   wherein, the one or more frequency-domain modulation module and/or the one or more spatial-domain modulation module are cascaded alternately;
   wherein the modulation module at each odd-numbered stage of the multistage space-frequency domain modulation module is the frequency-domain modulation module, and the modulation module at each even-numbered stage of the multistage space-frequency domain modulation module is the spatial-domain modulation module;
   wherein, when a total number of the modulation modules in the multistage space-frequency domain modulation module is an odd number, the last stage of the multistage space-frequency domain modulation module is the frequency-domain modulation module; and
   when the total number of the modulation modules in the multistage space-frequency domain modulation module is an even number, the last stage of the multistage space-frequency domain modulation module is the spatial-domain modulation module.

2. The system of claim 1, wherein the frequency-domain modulation module comprises:
   a frequency-domain modulation lens configured to perform Fourier transformation on the received optical information in spatial domain so as to transform the optical information into Fourier space; and
   a frequency-domain phase modulation layer, configured to perform phase modulation on the optical information in Fourier space, and
   the spatial-domain modulation module comprises:
   a spatial-domain modulation lens configured to transform the received optical information in Fourier space to spatial domain; and
   a spatial-domain phase modulation layer, configured to perform phase modulation on the optical information in spatial domain.

3. The system of claim 2, wherein
   the frequency-domain modulation lens or the spatial-domain modulation lens is a phase converter having a pupil, an equivalent phase transformation function of which is expressed by the following equation:

$$t(x, y) = \exp\left[-j\frac{k}{2f}(x^2 + y^2)\right] \cdot P(x, y),$$

wherein, k represents a wave number of light, f represents a focal length of lens, and $$P(x, y) = \begin{cases} 1, & \text{within the aperture of lens;} \\ 0, & \text{otherwise} \end{cases},$$

wherein, the phase modulation layer in the frequency-domain modulation module or the spatial-domain modulation module is a single diffraction layer or a lamination of a plurality of diffraction layers.

4. The system of claim 2, wherein the frequency-domain modulation module or the spatial-domain modulation module further comprises a nonlinear modulation layer, configured to perform nonlinear modulation on the phase-modulated optical information by using electro-optical effect and photorefractive effect of crystal.

5. The system of claim 4, wherein the nonlinear modulation layer is formed of SBN photorefractive crystal, and
   wherein, the variation $\Delta n$ of crystal refractive index of the SBN photorefractive crystal under external electric field and light is expressed by the following equation:

$$\Delta n = \frac{n_0 r_{33}(1 + I_0)EI}{1 + I}$$

wherein, $n_0$ represents an original refractive index of crystal, $r_{33}$ represents an electro-optical coefficient of the crystal, $I_o$ represents intensity of light in background, E represents intensity of electric field applied across the crystal, and I represents disturbance of a crystal surface on spatially-homogeneous intensity of background.

6. The system of claim 1, wherein, in the modulation modules at two adjacent stages included in the nonlinear all-optical deep-learning system with multistage space-frequency domain modulation, a phase modulation layer is close to the nonlinear modulation layer spatially in the former-stage module, and wherein the phase modulation layer and the nonlinear modulation layer in the former-stage module are arranged in the vicinity of the rear focal plane of the former-stage lens in the former-stage module, and also in the vicinity of the front focal plane of the latter-stage lens in the latter-stage module.

7. The system of claim 1, wherein the optical input module comprises a light source and an input object,
wherein, the light emitted from the light source irradiates the input object uniformly, such that the light transmits through the input object or is reflected by the input object, to convert information of the input object to the optical information of the transmitted light or the reflected light,
wherein, the information acquisition module comprises:
an information acquisition lens, configured to perform Fourier transformation on the modulated optical information so as to transform it onto the Fourier plane or the image plane; and
a sensor, configured to acquire the transformed optical information so as to generate the processed optical information.

8. The system of claim 7, wherein, in the optical input module, the input object is arranged at the front focal plane of a first frequency-domain modulation lens in a first frequency-domain modulation module in the multistage space-frequency domain modulation module that is adjacent to the optical input module, and
wherein a frequency-domain phase modulation layer is close to the nonlinear modulation layer spatially in the first frequency-domain modulation module, and wherein the frequency-domain phase modulation layer and the nonlinear modulation layer in the first frequency-domain modulation module are arranged in the vicinity of the rear focal plane of the first frequency-domain modulation lens in the first frequency-domain modulation module, and also in the vicinity of the front focal plane of a spatial-domain modulation lens in a spatial-domain modulation module adjacent to the first frequency-domain modulation module, and
wherein, in a second frequency-domain modulation module that is adjacent to the information acquisition module, the frequency-domain phase modulation layer is close to the nonlinear modulation layer spatially, and wherein the frequency-domain phase modulation layer and the nonlinear modulation layer in the second frequency-domain modulation module are arranged in the vicinity of the front focal plane of the information acquisition lens in the information acquisition module, and the sensor in the information acquisition module is arranged at the rear focal plane of the information acquisition lens.

9. The system of claim 7, wherein the input object is an object obtained through 3D printing, or implemented with a spatial light modulator,
wherein, when the input object is an object obtained through 3D printing, the information of the input object is image information of the object obtained through 3D printing, and
wherein normalized gray values of the image of the input object is obtained as the intensity of the light inputted to the multistage space-frequency domain modulation module.

10. A nonlinear all-optical deep-learning method with multistage space-frequency domain modulation, comprising:
establishing a numerical simulation model of an optical system with multistage space-frequency domain modulation, the system comprising an optical input module configured to convert input information to optical information, a multistage space-frequency domain modulation module configured to perform multistage space-frequency domain modulation on the optical information generated by the optical input module so as to generate modulated optical information, and an information acquisition module configured to transform the modulated optical information onto a Fourier plane or an image plane and to acquire the transformed optical information so as to generate processed optical information; and
manufacturing a physical model of the optical system in which a hardware system is installed to implement a target function,
wherein establishing the numerical simulation model of the optical system with multistage space-frequency domain modulation comprises:
setting a wavelength of a light source in the optical input module;
obtaining normalized gray values of an image of an input object as the intensity of the light inputted to the multistage space-frequency domain modulation module, by irradiating the input object uniformly with light emitted from the light source; and
modulating the inputted light through multistage space-frequency domain modulation module and acquiring it in the information acquisition module.

11. The method of claim 10, wherein, one or more frequency-domain modulation module and/or one or more spatial-domain modulation module are cascaded alternately in the multistage space-frequency domain modulation module, and
wherein establishing the numerical simulation model of the optical system with multistage space-frequency domain modulation comprises:
performing frequency-domain modulation on optical information in Fourier space through the one or more frequency-domain modulation module; and/or
performing spatial-domain modulation on optical information in spatial domain through one or more spatial-domain modulation module.

12. The method of claim 11, wherein, establishing the numerical simulation model of the optical system with multistage space-frequency domain modulation comprises:
arranging a phase modulation layer to be close to the nonlinear modulation layer spatially in the former-stage module of the modulation modules at two adjacent stages included in the nonlinear all-optical deep-learning system with multistage space-frequency domain modulation; and
arranging the phase modulation layer and the nonlinear modulation layer in the former-stage module in the vicinity of the rear focal plane of the former-stage lens in the former-stage module and in the vicinity of the front focal plane of the latter-stage lens in the latter-stage module.

13. The method of claim 10, wherein the frequency-domain modulation module and/or the spatial-domain modulation module comprises a modulation lens which is a phase converter having a pupil, an equivalent phase transformation function of the modulation lens being expressed by the following equation:

$$t(x, y) = \exp\left[-j\frac{k}{2f}(x^2 + y^2)\right] \cdot P(x, y),$$

wherein, k represents a wave number of light, f represents a focal length of lens, and $$P(x, y) = \begin{cases} 1, & \text{within the aperture of lens;} \\ 0, & \text{otherwise} \end{cases},$$

wherein, the phase modulation layer in the frequency-domain modulation module or the spatial-domain modulation module is a single diffraction layer or a lamination of a plurality of diffraction layers, wherein, the frequency-domain modulation module and/or the spatial-domain modulation module further comprises a phase modulation layer which is a single diffraction layer or a lamination of a plurality of diffraction layers, each diffraction layer implementing the simulation through phase modulation and Fresnel propagation over a given spatial distance.

14. The method of claim 13, wherein the frequency-domain modulation module and/or the spatial-domain modulation module further comprises a nonlinear modulation layer, and wherein establishing the numerical simulation model of the optical system with multistage space-frequency domain modulation comprises:

performing nonlinear modulation on the phase-modulated optical information by using electro-optical effect and photorefractive effect of crystal through the nonlinear modulation layer.

15. The method of claim 14, wherein the nonlinear modulation layer is formed of SBN photorefractive crystal, and wherein, the variation Δn of crystal refractive index of the SBN photorefractive crystal under external electric field and light is expressed by the following equation:

$$\Delta n = \frac{n_0 r_{33}(1 + I_0)EI}{1 + I}$$

wherein, $n_0$ represents an original refractive index of crystal, $r_{33}$ represents an electro-optical coefficient of the crystal, $I_o$ represents intensity of light in background, E represents intensity of electric field applied across the crystal, and I represents disturbance of a crystal surface on spatially-homogeneous intensity of background.

16. The method of claim 15, wherein manufacturing the physical model of the optical system in which a hardware system is installed to implement a target function comprises:

manufacturing the phase modulation layer physically through 3D printing or lithography technology according to the optimized structure and parameters of the optical system;

installing a hardware system correctly by selecting the light source, the lens or the photorefractive crystal according to the optimized simulation model to implement the target function of all-optical deep learning.

17. The method of claim 13, wherein obtaining an optimized simulation model by optimizing structure and parameters of the optical system with a deep-learning algorithm comprises:

establishing a deep-learning network according to the above numerical simulation model;

establishing a training set, a verification set and a test set by using information of the input object as an input of the deep-learning network and obtaining correct results of the target function as ground truth;

adjusting parameters of the phase modulation layer by using a minimum mean square error or a cross entropy a loss function and iterations based on an error back-propagation algorithm;

obtaining optimal optimization results of the structure and parameters of the optical system by varying at least one of the wavelength of the light source, the number of the frequency-domain modulation modules, the number of the spatial-domain modulation modules, the focal length and aperture of the lens, and the spatial distance between respective components.

* * * * *